(12) United States Patent
Roudy et al.

(10) Patent No.: US 10,549,185 B2
(45) Date of Patent: Feb. 4, 2020

(54) CHOOSE YOUR OWN PATH GAME

(71) Applicants: Ludovic Roudy, Paris (FR); Bruno Sautter, Petit-Bourg (FR)

(72) Inventors: Ludovic Roudy, Paris (FR); Bruno Sautter, Petit-Bourg (FR)

(*) Notice: Subject to any disclaimer, the term of this patent is extended or adjusted under 35 U.S.C. 154(b) by 375 days.

(21) Appl. No.: 15/225,373

(22) Filed: Aug. 1, 2016

(65) Prior Publication Data

US 2018/0028901 A1    Feb. 1, 2018

(51) Int. Cl.
| | |
|---|---|
| *A63F 9/24* | (2006.01) |
| *A63F 13/00* | (2014.01) |
| *G06F 17/00* | (2019.01) |
| *G06F 19/00* | (2018.01) |
| *A63F 13/25* | (2014.01) |
| *A63F 3/00* | (2006.01) |
| *A63F 3/04* | (2006.01) |
| *A63F 13/822* | (2014.01) |

(52) U.S. Cl.
CPC .......... *A63F 13/25* (2014.09); *A63F 3/00088* (2013.01); *A63F 3/0434* (2013.01); *A63F 13/822* (2014.09); *A63F 2003/00359* (2013.01)

(58) Field of Classification Search
USPC .............................. 463/9, 10, 15, 20, 22, 25
See application file for complete search history.

(56) References Cited

U.S. PATENT DOCUMENTS

| | | | | |
|---|---|---|---|---|
| 3,970,313 | A  * | 7/1976 | Montemayor | A63F 3/0449 |
| | | | | 273/243 |
| 4,071,247 | A  * | 1/1978 | Breslow | A63F 1/00 |
| | | | | 273/308 |
| 4,795,161 | A  * | 1/1989 | Chao | A63F 1/00 |
| | | | | 273/292 |
| 5,224,711 | A  * | 7/1993 | Dresser | A63F 3/00 |
| | | | | 273/275 |
| 8,678,392 | B1 * | 3/2014 | Alhazza | A63F 1/02 |
| | | | | 273/292 |
| 2007/0114719 | A1* | 5/2007 | Floden | A63F 3/00082 |
| | | | | 273/258 |
| 2010/0013156 | A1* | 1/2010 | Howell | A63F 3/00006 |
| | | | | 273/251 |
| 2011/0227286 | A1* | 9/2011 | Davies | A63F 3/00006 |
| | | | | 273/249 |
| 2014/0274283 | A1* | 9/2014 | Helava | G07F 17/3267 |
| | | | | 463/20 |

* cited by examiner

*Primary Examiner* — Adetokunbo O Torimiro
(74) *Attorney, Agent, or Firm* — Young & Thompson (57) ABSTRACT

A game using cards or virtual cards that are used by players during game play to dynamically create a board representing a territorial expanse. Game play takes place within the context of a narrative or story line for the characters playing the game wherein the narrative develops and unfolds according to explicit choices the player makes at multiple opportunities to choose among several options. The player choices that direct the game play and narrative are intended to ultimately resolve a goal-oriented quest or attain an objective assigned to the player's character. The game play and the assembly of the cards or virtual cards to form the territory arise from the characters' exploration of territory represented by a plurality of numbered cards and by the characters' interaction with other features of the cards and with the features of non-numbered cards.

10 Claims, 11 Drawing Sheets

CHOOSE YOUR OWN PATH GAME

FIELD OF INVENTION

The present invention relates to games with a modular boards representing a territorial expanse and game play driven by resolution of a task and the choices a player makes within the territory to resolve the task.

BACKGROUND

Bantam's *Choose Your Own Adventure* series of books was an interactive storybook series that allowed the reader to take a role relevant to the unfolding adventure of the story. Such stories are told from the second person point of view with the reader making choices that determine the main character's actions and the plot's development.

The stories were generally formatted so that reader faces two or more options shortly after the story begins. This leads to more options and ultimately to one of many endings. When an option is presented and chosen by the reader, the reader flips to a chapter indicated by a unique number. The format results in an unpredictable story and the possibility of multiple readings.

The board game genre includes modular board games wherein play occurs upon a modular board that is composed of multiple pieces, often tiles or cards. In many such games, board placement is randomized, leading to different possibilities for strategies and exploration. The layout of the board and the gameplay changes significantly from one game to the next. Some modular board games feature players drawing terrain tiles randomly from a common deck and adding them to the board made up of tiles previously drawn and played. The drawings and playing of terrain tile builds a board that can constitute a map or expanse of terrain.

SUMMARY

The board game of the present disclosure is an adventure and exploration driven game of territorial exploration and task resolution. One or more players each command a character using a token or virtual token placed on the board. Each player has the opportunity to draw and play numbered cards that include territory cards as well as a variety of other types of non-numbered cards.

A general object of the invention is to provide a board game with a board dynamically assembled during game play with numbered and non-numbered modules and which represents a territorial expanse play in which players may choose from a plurality of options presented by the modules to direct play action with unexpected results toward an ultimate goal. The object of the game is to resolve a quest or complete a task that is part of the overall game narrative. One of the central features of the game is that the players direct the narrative, the building of the board, and the action by choosing at each step from the indicia on the numbered and non-numbered modules which path or actions the characters are to take.

BRIEF DESCRIPTION OF THE DRAWINGS

For a more complete understanding of the present disclosure, and the advantages thereof, reference is now made to the following descriptions taken in conjunction with the accompanying drawings, in which.

Figure 1:
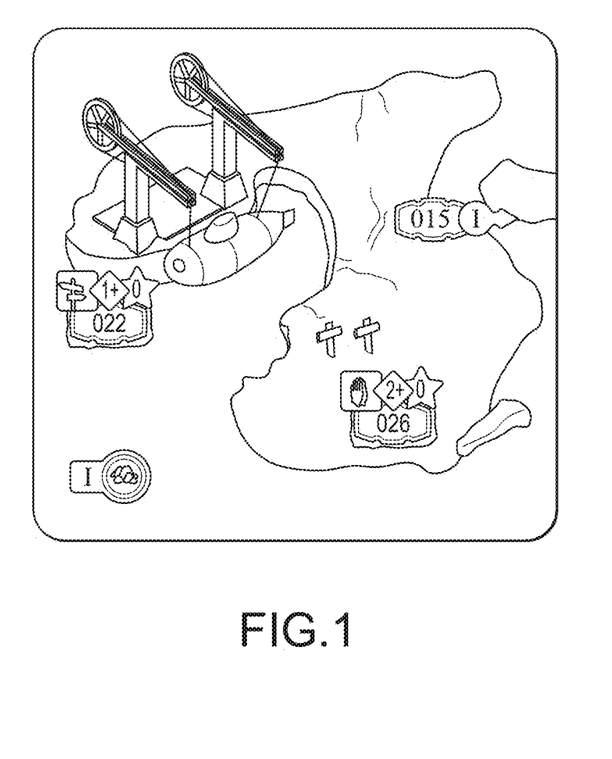
FIG. 1 is an exemplary embodiment of a terrain card, which features a number on the reverse side (not shown), and several icons indicating possible actions and their cost and consequences.
Figure 2:
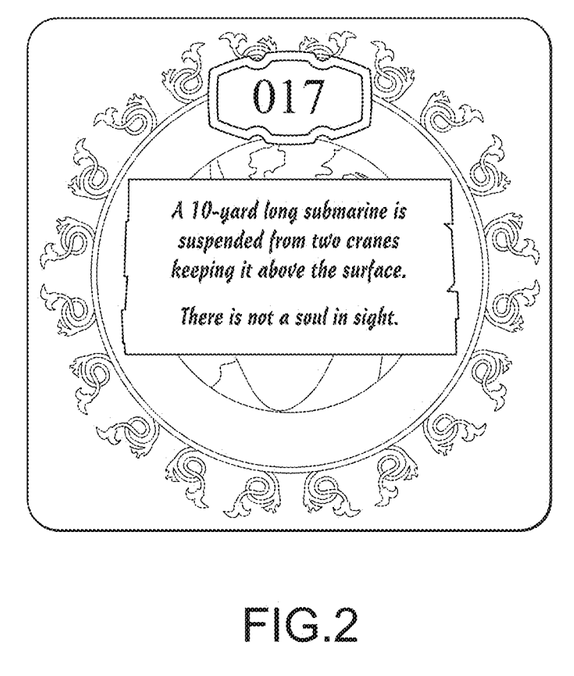
FIG. 2 is an exemplary embodiment of a reverse side of a numbered card showing a number and text that is both part of the overall narrative of the game's storyline and also indicative of the content of the other side of the card.
Figure 3:
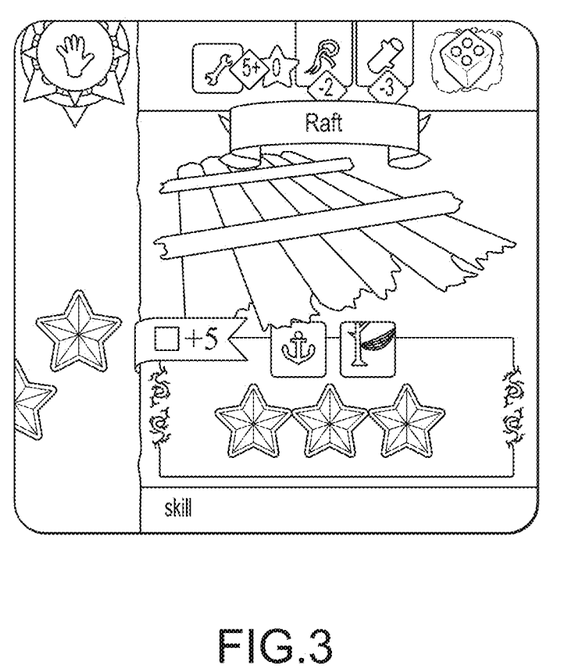
FIG. 3 is an exemplary embodiment of a card showing a Skill that allows player to craft an item, in this case a raft. Item cards are used by a player to perform or help perform an action shown on the Item Card. In the embodiments of the Item Cards shown, the item is assigned a durability factor represented by the die in the upper corner.
Figure 4:
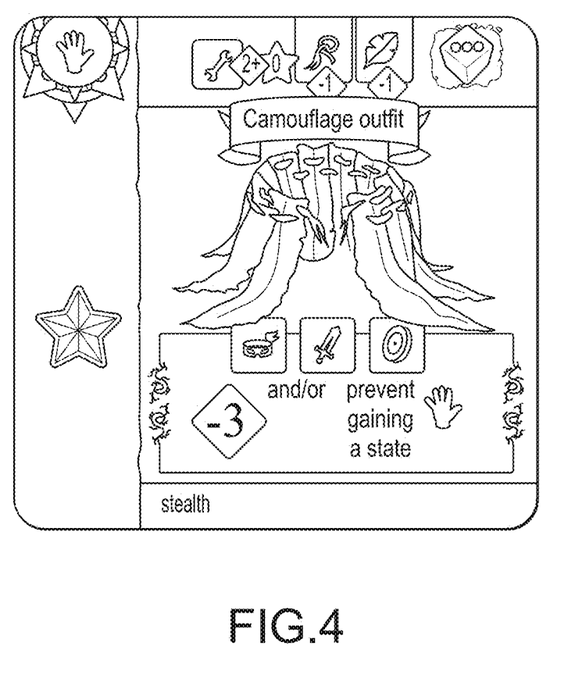
FIG. 4 is an exemplary embodiment of a Skill that allows player to craft an item Card, in this case a camouflage outfit.
Figure 5:
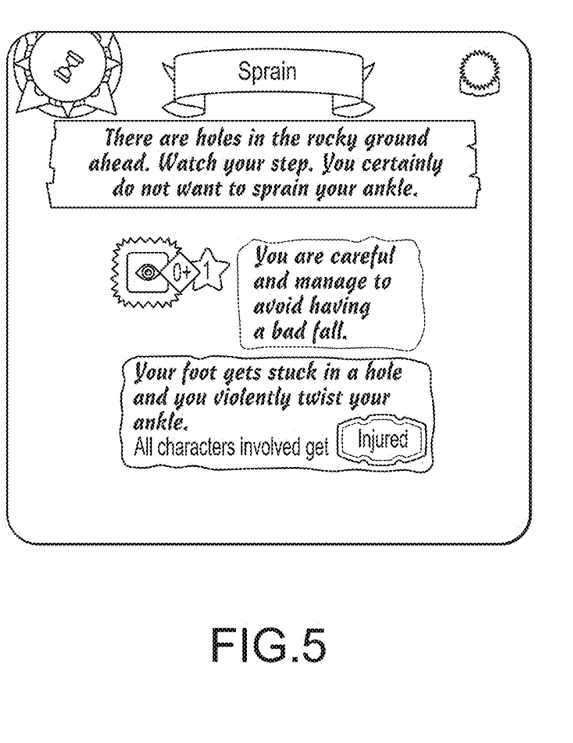
FIG. 5 is an exemplary embodiment of a card representing a random event non-numbered card in which involved players must perform an action in order not to get a state "injured" card.
Figure 6:
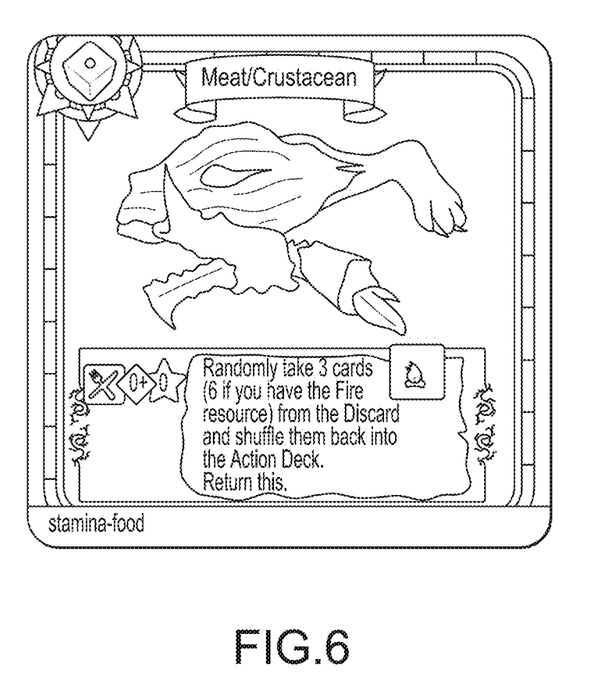
FIG. 6 is an exemplary embodiment of an Item card indicating food, in this case meat/crustacean.
Figure 7:
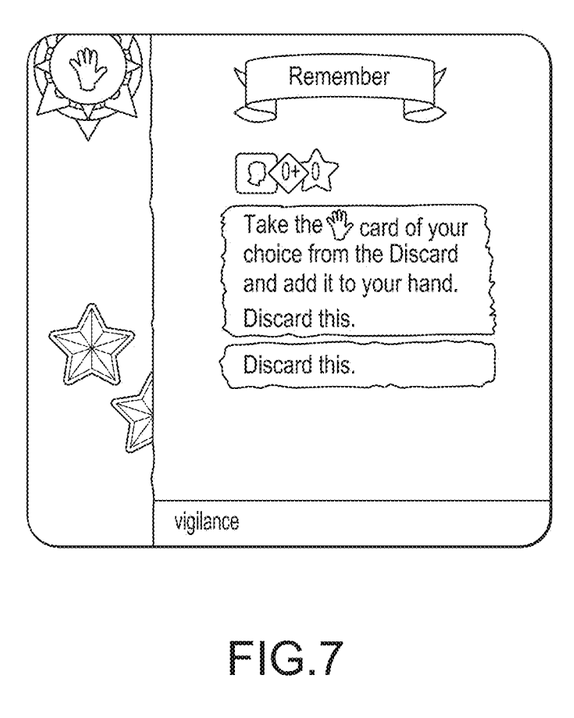
FIG. 7 is an exemplary embodiment of a Skill "remember" card, which allows a player to take any card from the discard.
Figure 8:
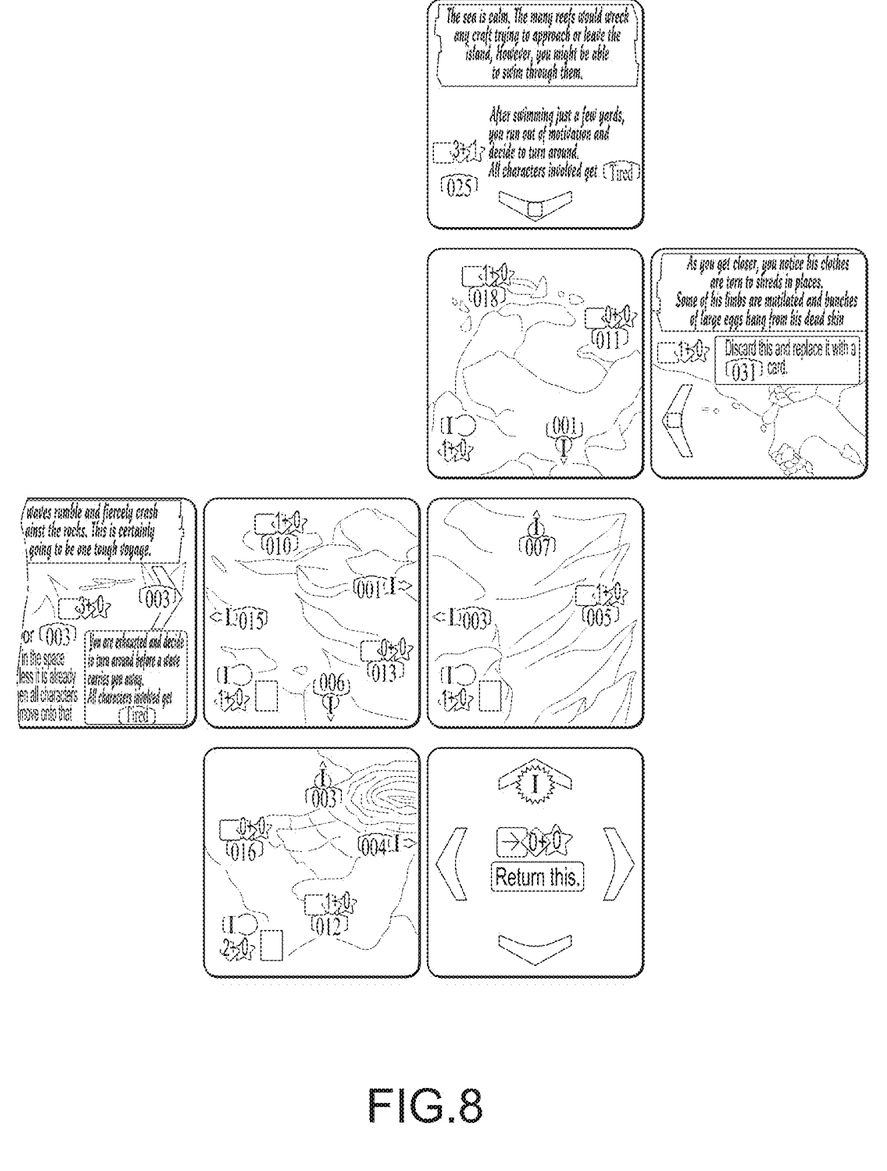
FIG. 8 depicts an exemplary embodiment of a game board constructed during game play. It shows contiguous terrain cards as well as permanent event cards and random—not yet revealed—event card.
Figure 9:
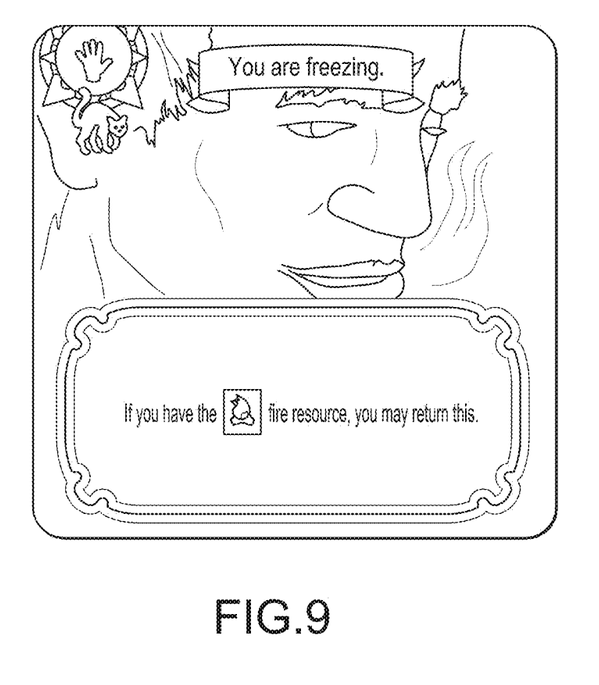
FIG. 9 is an exemplary embodiment of a state card indicating the state of freezing, and the recourse—fire—that can be used to prevent or resolve the state.
Figure 10:
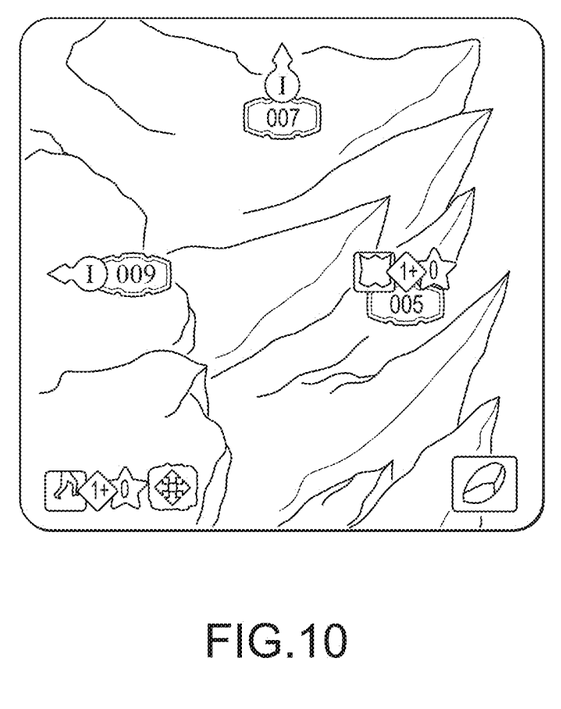
FIG. 10 is an exemplary embodiment of a terrain card with indicia of a move action in the bottom left hand corner.
Figure 11:
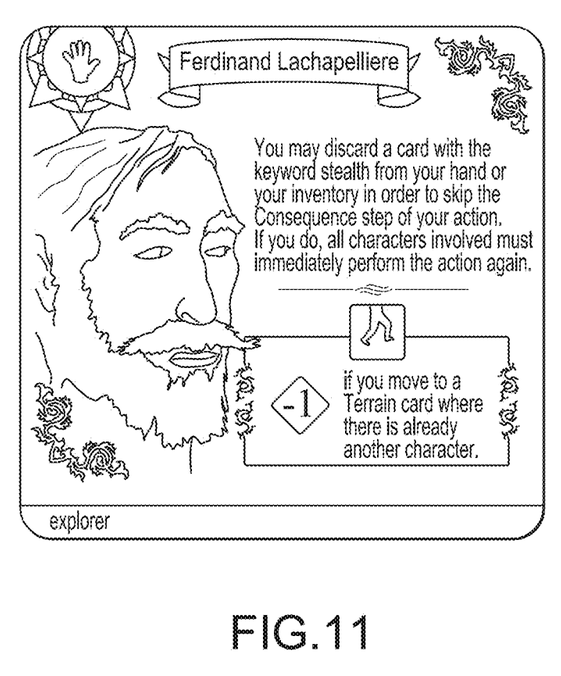
FIG. 11 is an exemplary embodiment of a character card indicating the name and characteristics of a character that a player can choose to play the game.

The icons on the cards can indicate various actions that a player may choose to take, for example: move; walk in the snow; spot/notice; craft; make fire; think/pull myself together; go and see; search/examine; eat/drink; cure; take/handle; hunt; fish; fight; swim/navigate; climb; dig; open/close/pick the lock; pray/make an offering; find my bearings; find a path/follow my route/run away; keep balance/jump; pull/push/lift; be discreet; play music; decipher; rest; give/coax/domesticate.

DETAILED DESCRIPTION

A representative embodiment of the board game is called The $7^{th}$ Continent. The game described herein is in view of a particular preferred embodiment. However, it is understood that within the rules and parameters of the game described herein, the specific form and appearance of the physical components of the game, such as the cards and game pieces, etc., may be modified as desired.

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents, and alternatives are intended to fall within the spirit and scope of the present invention.

The game is an adventure, exploration and survival board game, in which the player plays against the game with the ultimate goal of finalizing a quest or resolving a task. The game may be one player or multiple players. With multi-players, the players may act independently or may cooperate in their actions.

The game includes are a plurality of numbered cards comprising an Adventure deck wherein the cards are arranged consecutively. The play action begins by starting with card number 001.

Each player uses a character to proceed to explore the game terrain by performing the actions available on the Terrain Card that a character is standing on, the Event cards attached to it, the Skill, State and Bonus cards held by the player and the Item cards in the player's inventory.

Once a player has selected a character from those available the player will explore the game landscape by resolving random events and putting into play numbered terrain and permanent event cards which will gradually form the game board.

In order to perform these actions, a player will use the Action Deck that serves as the life force for the characters. Every action requires the player to draw a required minimum number of cards from the Action Deck and obtain a required minimum number of successes to succeed. These successes are shown in variable quantities on the cards a player has drawn.

Failing at performing an action may have negative consequences and cause the player to acquire negative State cards that might force the player to discard cards from the Action Deck, which reduces the players' life force.

A player can choose to draw more cards from the Action Deck to get more successes. This increases the chances to obtain more successes. However every card in the Action Deck uses a bit of the player's life force, so when the Action Deck is exhausted, there is a greater chance of losing the game.

Skill Cards, Bonus Cards, and Item Cards, and help from other players when the game is played in cooperative mode, can all be sued to support the actions of a player's character. In particular, this help can be in the form of decreasing the number of Action cards that must be drawn to perform an action or by providing additional successes in that attempt and therefore increasing his chances of succeeding.

In one embodiment, the premise of the game is that the characters were the first people to discover a new continent. After visiting the new content, the discoverers return home to find that they are cursed with visions and nightmare and an overwhelming feeling that they must return to the newly discovered continent to break the curse. The return to the new content is the start of the game. The players can begin the game in several different scenarios and locations from the numbered card deck, but not necessarily from the first numbered card 001.

In this premise the goal of the game is to find where on the new continent and in what manner each player can unlock the curse. Multiple different curses are possible. In one embodiment, there are four curse options. Each curse has a specific way for the player to resolve it.

In order to explain the game, the playing components, and the strategic elements of game play, it will be helpful to define the terminology that will be used herein. These terms will help one understand the features shown in the drawings.

Terminology

Action Deck: the Action cards a player draws to perform actions.

Discard: the play area into which players discard Action cards.

Adventure Deck: numbered cards that may include several types of cards including for example (i) Terrain cards that represent terrain on which the characters navigate and which are used to build out the board, (ii) cards that represent predetermined events such as encounters with places, obstacles, or persons, (iii) cards that represent items/food that can be used by players, (iv) cards that represent discoveries, (v) cards that represents State that players can acquire, especially when failing at performing an action, and (vi) experience points that players can acquire then spend to purchase Advanced Skill cards. The cards can be absolutely consecutively numbered or can include multiples of some numbers.

Exploration Deck: Random events cards sorted by area (I, II, III, IV).

Past: the space in the gaming area into which players discard cards that are not Action cards.

Banish: to remove a card from play for the entire remainder of play action. The banished card goes to the dedicated banish space in the game box.

Board: the area formed by Terrain cards, Permanent Event cards and Random Event cards that are in play, including both revealed and not revealed Random Event cards.

Curse card: a card that identifies a curse afflicting a character, the resolution of which is the ultimate goal of the game. A curse card can be identified by a label or an icon.

To discard: to place an Action card into the Discard pile or another card into the Past.

To draw: to take the top card(s) of the Action Deck.

Durability: the number of times an item can be used. When an item's durability reduces to zero it is destroyed.

Inventory: the space in the gaming area into which players place their Item cards.

Purchasing cost: the number of experience points a player must spend to gain an Advanced Skill card.

Resource: a material such as wood, stone, bone, etc. that is available on a Terrain card, an Event card, etc. Resources may reduce the number of cards a player must draw when crafting certain items.

Return: to place a card back into its original pile.

Satchel & notebook: the card under which players store any Special Quest Item cards they may receive.

Terrain: A card that shows a parcel of land of the geographical expanse of the play area.

Survival Skills

For a player to continue playing the player's character must employ survival skills.

Food/Life Force

These can include for example finding food by hunting or fishing. Food can be used to replenish the Action Deck (life force or stamina metric that is tracked for each player throughout the game) and which diminishes due to various activities or injuries and must be replenished for survival.

Crafting Items

These can also include crafting items to help a character through risky situations by reducing the number of Action cards required to be drawn to perform a specific action of provide additional successes.

Advanced Skills

The Action Deck can include advanced Skill cards that can be employed by the players. In one embodiment, the employment of advanced skills requires the expenditure of points such as experience points gained throughout play.

Continuous Play and Adventure

Unlike most board games, the presently disclosed board game allows the player to experience one extended, nonstop adventure. The game may require several hours of exploration before the curse is resolved or the character dies trying.

Setup

To set up the game and begin play, each player selects a character to play by taking the corresponding Character card. An Action Deck is assembled by shuffling together all the Basic Skill cards with all the Skill cards specific to any character that is playing. The Action Deck is placed face down in front of the players. The "Satchel & Notebook" card is placed face up in front of the players.

The game includes Curse cards and Clue cards that correspond to each curse card. Each player must select one or more Curse cards that will be shuffled into the Action Deck and the Clue card that corresponds to the chosen Curse cards, which will be placed under the "Satchel & Notebook" card. Any unused Curse cards or Clue cards are returned to the game box. There may be non-specific Curse cards such as "death is lurking" Curse cards that should also be placed into the Action Deck.

The consecutively numbered Adventure Deck should be arranged consecutively and placed face down with the numbers facing up.

The Exploration Deck (random events cards) should be sorted according to their area number (I, II, III, etc.) without looking at them and place with the non-content side up ("fog of war side").

Play is begun when a player takes the first numbered card from the Adventure Deck. The player should read the card and place it face up on the play surface to form the first unit of the game board. Each figurine of each character should be placed on this first Terrain card. If the card includes an icon correlating to a Random Event card, the player takes a Random Event card and places it on the board, making sure it is oriented in the same way as the other cards on the board.

Game Round

During game play, the characters can perform various actions. In certain instances certain actions may be required and not optional. For optional actions, the player decide freely whether an action will be performed or not, and if multiple actions options are available, how many of such actions will be performed and in what order. If there are multiple players, the players may decide collectively which characters will perform which actions.

Available actions are indicated on various cards. The indication can take the form of text or an icon or other symbol. The game includes a variety of types of actions. If actions are indicated by icons, in a preferred embodiment all actions may share a shape and/or color, such as a white square, and the specific type of action can be indicated by a symbol within the white square, such as a fork and knife for the "eat/drink" action. An action indication can also indicate that the action is mandatory. In a preferred embodiment a mandatory action is indicated with a white square icon outlined in red.

A player can perform an action indicated on various cards. In a preferred embodiment, actions available to the player appears on multiple cards, preferably at least three different types of cards. In a preferred embodiment, the player may take actions indicated on the Terrain card on which the player's character is standing, on any Permanent Event card attached to the Terrain card on which the figure is standing, on a Temporary Event card just revealed by game play, on a card held in the player's hand (Skill, State or Bonus card), or on a card held in the player's inventory (item).

Once a player has finished an action, the player either performs another action or game play proceeds to the next player. In one embodiment the player may perform a second action only if all the other players agree. In other embodiments, the player may freely perform a set number of actions, such as two or three, but must obtain permission of one or more other players to exceed this number.

Actions must take place one at a time. An action cannot be performed if another action is in progress. An action cannot take place if it would require putting a card into play in an occupied space on the board.

Action Resolution

Every indicated action option indicates the minimum number of cards that the player must draw from the Action Deck to perform it, as well as the minimum number of successes the player must obtain to succeed in performing the action. The player may choose to take more than the minimum number of Action Deck cards.

The player performing the action is the active player. Any non-active player whose figure is on the same Terrain card as the active player's may choose to become involved in the action of the active player user non-active player's Skill, Bonus and Item cards to help the active player. In a preferred embodiment, the non-active player may assist the active player only with the permission of the active player.

An action is resolved in a sequence of steps. Each player involved in the action may use one or more items from the players' inventory to apply the effects of the item. The durability of each used item is then reduced by 1, which modifies the durability indication on the item so that it shows updated durability metric. If the durability metric become zero, the item is removed from the inventory.

During a single action, players may use each item at most once.

Cost of Performing Actions

Each action has a specified cost in terms of how many Action cards are required to be drawn from the Action Deck. The active player draws a number of cards from the top of the Action Deck equal to the cost of the action and places them face down. The player may draw more cards from the Action Deck in order to boost the chances of succeeding, unless the action has an indication that this is prohibited. In a preferred embodiment, this prohibition is indicated by an icon of a pad lock. Any additional cards drawn are placed face down next to the previously drawn cards.

If several players are involved in the action, the active player may choose to reduce the number of cards that must be drawn by (−X) and increase the number of successes required to complete the action by the same amount (+X).

Each player involved in the action may apply the effects of one or more Skill and/or Bonus cards from the player's hand in order to decrease the number of cards that must be drawn.

Each player involved in the action may apply the effects of one or more of the player's Item cards being used in order to decrease the number of cards that must be drawn.

Determining the Result of the Attempt to Take Action

The active player flips all the cards drawn from the Action Deck face up and determines the result of the attempt to perform the action. The player counts how many successes are indicated on the face side of the Action Deck cards. In a preferred embodiment, successes are indicated by gold stars or half gold stars that can be considered to combine to form a full gold star.

In a preferred embodiment, the fractional gold stars can be considered to combine only if they are correctly oriented to match when the cards are placed next to each other. This mechanism can provide for a high degree of variability in play action with a limited number of cards because the combinability of the cards provides for more possible outcomes.

Each player involved in the action may apply the effects of one or more Skill and/or Bonus cards held by the player in order to obtain additional successes.

Each player involved in the action may apply the effects of one or more of his/her Item cards being used in order to obtain additional successes.

If player(s) obtain as many successes as required by the action or more, the action is a success and is considered accomplished. If the number of successes is not reached, the action fails and is not carried out.

Collection of Skill Cards from the Flipped Cards

As noted above, taking an action requires the selection of Action Cards and then simultaneously flipping the Action cards to determine the result. If any of the flipped Action cards are Skill cards, then one player may take one of the Skill cards into hand. There are many permutations possible to the mechanism. In a preferred embodiment, only one character involved may take a Skill card. In a preferred embodiment, the action player may allow or disallow another player who helped achieve the action take up an available Action card, which can serve as an incentive for players to help each other. In alternate embodiments, any player may take up available Skill cards, or the limit on the number of Skill cards that can be held may be higher or lower. In an alternate embodiment, one or more players may exchange available Skill cards with Skill cards held.

Discard Action Cards not Picked Up and Broken Items

Any item cards that were used in the attempt to perform the action and which after such attempt have a durability metric of zero must be discarded.

The player discards all other Curse cards and Skill cards drawn from the Action Deck into the Discard.

Consequence

The consequences of a success or a failure of an action are indicated on the card on which the action was derived. In a preferred embodiment, the consequences of success are indicated in a white area, while the consequences of failure are indicated in a black area. Some actions have no consequences for failure.

Only the active player is affected by the consequence of an action, unless the applicable section indicates otherwise, with for example the text "all characters involved . . . ", in which case each player who took part in the action is affected by its consequence.

In one embodiment, if several characters were involved in an action that failed, the active player must draw a numbered card that is a "Paranoid" State card and therefore must be added to his hand.

When the Action Deck becomes empty, the Discard is shuffled and placed face down. The active player must now draw from this face down Discard, not from the Action Deck. In one embodiment, when the game proceeds to drawing Action cards from the shuffled face down Discard, if the player reveals a Curse card during the Result step of the action, the game ends immediately and the players lose.

Consequences of Actions and Events

When the consequence of an action or an event is to take a numbered card, the player must take the indicated card from the Adventure Deck. If there is a number before the numbered box, the player must take that many cards bearing that number. If there is more than one copy of the card, the active player randomly takes one of the green cards before revealing it.

The numbered cards of the Adventure deck may include text on the back that fit the narrative of the game and which may offer hints of the substantive content on the face of the card. The Adventure Deck may contain different types of cards and multiple cards of different types with the same number. If there is more than one card in the Adventure Deck with the same number, and the active player is required to choose a card with the number, in a preferred embodiment the player must choose a card of a specific type, for example green card before the golden card.

If the active player is directed to take a card that is unavailable in the Adventure Deck, the player must pick up the Past and return all cards to their appropriate decks, and then take the card that is now available.

In a preferred embodiment, the numbers on the cards can be associated with a flag icon and if the Item card also includes a flag icon with a number, the player may add the numbers and take the card bearing the sum of the numbers.

Permanent Event Cards

If a permanent event card is revealed when flipping over cards during the attempt to execute an action, the Permanent Event card must be placed on the board. In a preferred embodiment, the Permanent Event card includes an orientation icon, for example an arrow, that determines the orientation of the card to the Terrain card on which the active player's figurine is standing. When placed on the board, the event is attached to the Terrain card it is associated with and any actions, resources and effects shown on the Event card are available to any player whose figure is standing on the Terrain card.

Random Events

In a preferred embodiment, Terrain cards may contain on one or more edges an icon in the form of an arrow or other suitable symbol that indicates a free space. Whenever a player puts a Terrain card into play that includes a free space icon, the player must place a Random Event card next to the free space arrow. The Random Event cards may have one side with minimal information, for example called the "fog of war" side, and a face side with the full information/effect. The Random Event cards are initially placed face down, with the fog of war side face up.

Once a Random event has been resolved and its card has been discarded, the player must put the numbered card associated with the arrow into play in the space the arrow points to. If the numbered card is Terrain, the player should assure that the image fits the initial Terrain card like a piece of a puzzle.

Once the new Terrain card is in play, new Random event cards must be placed on each free space an arrow points to.

A permanent Random Event card stays in play, making it impossible to discover the terrain it hides, until it is resolved and discarded.

Movement of Characters Across the Board

The terrain cards include actions (move, walk in the snow, swim, etc.) whose consequence enables the character tokens to move to another Terrain card on the Board that is contiguously connected to the terrain card on which the token in placed at any given time. If the Terrain card on which the figure stands is not contiguous with the target Terrain card because the path is interrupted by a non-Terrain card, the movement cannot be made to that location.

In order to put a Terrain card into play on a given space, players must first remove any Random event card occupying that space.

Spot a Hidden Number

In a preferred embodiment hidden numbers can be found on some Terrain cards, Event cards, or other cards. A hidden number may appear as faint or otherwise obscured or small number placed somewhere on the card. The number is hidden in the sense that it is not conspicuous and may be very difficult to identify unless the player is actively looking for it.

If a player finds a hidden number the player may discard the card on which the hidden number appears and replace it with the card from the consecutively numbered cards that bears that number. For example, if a player finds a hidden number 014 on a card, the player may discard that card and replace it with the card numbered 014. In the preferred embodiment, the replacement of a card in this manner is not an action.

The Adventure card of the hidden number will bear an icon associated with the number of the card who called in so the player knows he drew the correct card. For example, if hidden number 014 is on card 163, then a "correct card' icon [163] will be displayed on the back of card 014.

Eliminated Character

A character is eliminated if the applicable consequence of an action the player is involved in states indicates that the player is eliminated. In a preferred embodiment the card indicates, "Your adventure is over." In the preferred embodiment, if a player is eliminated, the player must discard all Skill and Bonus cards the player has in hand, discard all Item cards in the player's inventory, and return all State cards the player has in hand and all State cards showing the character's face, whether in the player's hand, the Action Deck, or the Discard.

Winning

The game ends and a player wins or the players collectively win when the goal or quest is completed. This is indicated by the game through a numbered card.

Losing

The game ends and a player loses or the players collectively lose when all characters are eliminated or when there are no cards left in the Action Deck and the active player draws/reveals a Curse card from the Discard during the Result step of the action he is performing.

Join a Game in Progress

A player can join a game in progress or continue the adventure with the player's group if the player's character was eliminated. To join a game in progress, the player chooses any character not being played and takes the corresponding character card. The player shuffles the Skill cards specific for the chosen character into the Action Deck.

Easy Saving

In one embodiment, the game includes an easy saving feature that allows the player to stop playing at any time and resume playing at a later time. The game may be saved provided that no player is performing an action. In cooperative mode the game cannot be saved unless all characters' figures are on the same Terrain card.

In one embodiment the game is saved in the following manner. All the cards of the Board are discarded into the discard pile except for the Terrain card on which all the characters' figures are standing.

All cards in the Past are returned to the appropriate deck. The remaining cards are stacked in the following order and placed in a dedicated space in the game box: (1) the Terrain card on which the figures were standing; (2) the "Satchel & Notebook" card along with all the Special Quest item cards that may have been underneath the Satchel & Notebook card. (3) The Action Deck Save Card along with all the Action Deck cards that may have been underneath it; (4) the Discard Save Card along with all the cards in the Action Deck Discard that may have been underneath it; (5) each characters' Character card and underneath it all the Skill, Bonus and State cards held by the player and all the Item cards in the player's inventory. Each item in a player's inventory is saved by using one Item save card and placing the cards that make up the item underneath the save card. The durability metric of the item card is saved by orienting the save card for the item so that its durability is shown in the upper part of the save card.

The game is resumed after saving in the following manner. The "Satchel & Notebook" card is put back into play with its associated cards underneath it.

The Action Deck is put back into play.

The Discard is put back into play.

The single Terrain card is put back into play with all the characters' figures on it.

Each player takes all of the player's Skill cards, Bonus cards, and State cards back in hand.

Each player puts the items the player had in inventory back into play, making sure each displays the number shown in the top part of the item's Save card.

All Save cards are returned to the box.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein. The disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A game comprising:
   numbered cards arranged in a first deck,
      the first deck comprising a plurality of numbered cards with indicia representing a territorial expanse and also non-territorial indicia,
      the first deck further comprising a plurality of numbered cards that do not represent a territorial expanse and instead show only non-territorial indicia,
   non-numbered cards comprising at least one second deck,
      wherein the non-numbered cards do not include indicia of a territorial expanse and instead show only non-territorial indicia,
   a board dynamically assembled during game play comprising,
      numbered cards, including both the numbered cards with indicia of territorial expanse and numbered cards without indicia of territorial expanse,
      non-numbered cards,
      a contiguous territorial expanse comprising the portions of the board made up of numbered cards with indicia of territorial expanse
   one or more tokens, each representing a player's character, placed on the territorial expanse,
   the non-territorial indicia appearing on the numbered or non-numbered cards comprising, for each such card, indicia of a plurality of options available to the token for progressing game play.

2. The game of claim 1 where the non-numbered cards comprising the board are removable from the board during game play.

3. The game of claim 1 further comprising at least one discard deck for the non-numbered cards.

4. The game of claim 1 wherein the numbered cards showing indicia representing a territorial expanse may be either permanently or temporarily placed in the board.

5. The game of claim 1 wherein the non-territorial indicia comprise a narrative.

6. The game of claim 1 wherein the non-territorial indicia of the numbered or non-numbered cards indicate at least one of the following:
 a. an event inflicted upon a character;
 b. actions that a character may voluntarily choose to perform;
 c. food that may be used by a character;
 d. the physical status of a character;
 e. the stamina level of the characters
 f. encounter with places, obstacles, or persons;
 g. items and/or weapons that a character may use from an inventory;
 h. Resources that a character may use;
 i. skills or characteristics of the character;
 j. experience points that may be collected by the characters; or
 k. a problem that the character must resolve.

7. The game of claim 1 wherein the characters may act together or independently.

8. The game of claim 1 that includes a save system that allows player to cease play and begin play again at a later time, the save system comprising separately stacking the different types of cards into decks.

9. The game of claim 1 that takes place on a computer or other virtual environment the depicts cards and the tokens on a screen.

10. The game of claim 1 wherein a player's decision can result in the permanent removal of one or more cards from the game, such that the options presented by the removed card will not be available later in during that same game.

* * * * *